(12) United States Patent
Shimada et al.

(10) Patent No.: US 7,545,657 B2
(45) Date of Patent: Jun. 9, 2009

(54) SWITCHING POWER SOURCE APPARATUS

(75) Inventors: Masaaki Shimada, Niiza (JP); Masaru Nakamura, Niiza (JP); Akihiro Uchida, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 81 days.

(21) Appl. No.: 11/843,374

(22) Filed: Aug. 22, 2007

(65) Prior Publication Data

US 2008/0175027 A1 Jul. 24, 2008

(30) Foreign Application Priority Data

Aug. 28, 2006 (JP) ............................. 2006-230868

(51) Int. Cl.
*H02M 3/335* (2006.01)
(52) U.S. Cl. .................... 363/49; 363/21.08; 363/21.16
(58) Field of Classification Search ................... 363/15, 363/16, 18, 19, 20, 21.01, 21.04, 21.08, 21.09, 363/21.12, 21.16, 21.17, 49, 97, 131
See application file for complete search history.

(56) References Cited

U.S. PATENT DOCUMENTS 6,960,906 B2 * 11/2005 Yamashita ................... 323/285

2008/0175027 A1 7/2008 Shimada et al.

FOREIGN PATENT DOCUMENTS

JP 2003-333840 11/2003

OTHER PUBLICATIONS

U.S. Appl. No. 12/212,285, filed Sep. 17, 2008, Nakamura.

* cited by examiner

*Primary Examiner*—Gary L Laxton
(74) *Attorney, Agent, or Firm*—Oblon, Spivak, McClelland, Maier & Neustadt, P.C.

(57) ABSTRACT

A switching power source apparatus includes a switching element connected through a primary winding of a transformer to a DC power source, a start circuit for a control circuit, a rectify-smooth circuit of a voltage of a secondary winding of the transformer, and a rectify-smooth circuit to rectify and smooth a voltage of a tertiary winding of the transformer into a source voltage for the control circuit. The start circuit supplies a first starting current to start the apparatus and stops the first starting current once the apparatus has started. If the source voltage to the control circuit decreases to a turn-off voltage after the apparatus has started, the start circuit supplies a second starting current that is smaller than the first starting current. If the source voltage to the control circuit further decreases to a predetermined voltage that is lower than the turn-off voltage, the start circuit supplies the first starting current.

3 Claims, 10 Drawing Sheets

SWITCHING POWER SOURCE APPARATUS

BACKGROUND OF THE INVENTION

1. Field of the Invention

The present invention relates to a switching power source apparatus, and particularly, to a technique of shortening a starting time of a start circuit of the switching power source apparatus and minimizing losses in the start circuit.

2. Description of the Related Art

FIG. 1 is a circuit diagram showing a switching power source apparatus according to a related art. In FIG. 1, the switching power source apparatus includes a DC power source E, a capacitor C12, a start circuit 1, a transformer T with a primary winding P1, secondary winding S, and tertiary winding P2, a switching element Q10 (e.g., a MOSFET), a resistor R10 for detecting a current passing through the switching element Q10, a control circuit 3 for controlling ON/OFF operation of the switching element Q10, a first rectify-smooth circuit having a diode D11 and capacitor C11, a second rectify-smooth circuit having a diode D10 and capacitor C10, and a detector 7.

The capacitor C12 represents an equivalent capacitor that is present at an input part of the switching power source apparatus, such as a smoothing capacitor to rectify and smooth AC power for the switching power source apparatus. Due to this configuration, an input voltage to the switching power source apparatus is not immediately zeroed when the DC power source E is cut. The start circuit 1 is connected between a positive terminal of the capacitor C12 and a power source input terminal of the control circuit 3 and is also connected to a first end of the primary winding P1 of the transformer T. The DC power source E always or intermittently applies power to the start circuit 1. The control circuit 3 becomes operative in response to a turn-on voltage Von (e.g., 18 V) and changes to inoperative in response to a turn-off voltage Voff (e.g., 9 V). Based on an output voltage Vout detected by the detector 7, the control circuit 3 turns on/off the switching element Q10, to maintain the output voltage at a predetermined voltage.

The start circuit 1 includes a series circuit connected between the first end of the primary winding P1 of the transformer T and a first end of the control circuit 3, the series circuit including a resistor R1, constant current circuit CC1, switch SW1, and diode D1. The start circuit 1 also includes a comparator CP. The comparator CP has an inverting input terminal connected to a connection point between a cathode of the diode D1 and the first end of the control circuit 3, anon-inverting input terminal connected to a reference power source Vr1, and an output terminal connected to a contact of the switch SW1. The comparator CP has a hysteresis characteristic so that it provides a low-level output when the inverting input terminal reaches, for example, 18 V and a high-level output when, with the output of the comparator CP being low, the inverting input terminal drops lower than, for example, 9 V.

Operation of the switching power source apparatus of FIG. 1 will be explained. When the DC power source E is enabled for the switching power source apparatus, a voltage Vst is applied through the resistor R1 to the constant current circuit CC1 in the start circuit 1. At this time, the switch SW1 is ON, and therefore, the constant current circuit CC1 passes a constant current Ist (e.g., 2.5 mA) to charge the capacitor C10 through the diode D1. A voltage of the capacitor C10 is supplied to the power source terminal of the control circuit 3. Namely, the control circuit 3 receives a voltage Vcc.

At the starting, the voltage Vcc to the control circuit 3 is lower than the turn-on voltage Von of 18 V, and therefore, the comparator CP provides a high-level output to maintain the ON state of the switch SW1. When the voltage Vcc reaches the turn-on voltage Von, the control circuit 3 starts to provide a drive signal Drv to turn on/off the switching element Q10. As a result, the primary winding P1 of the transformer T intermittently receives the DC power source E to induce a voltage on the secondary winding S. The voltage on the secondary winding S is rectified and smoothed with the diode D11 and capacitor C11 into an output voltage Vout that is applied to a load 5. The output voltage Vout supplied to the load 5 is compared with a reference voltage in the detector 7, which provides an error signal to the control circuit 3. The control circuit 3 generates the drive signal Drv whose duty factor is determined due to the error signal, to turn on/off the switching element Q10.

At the time when the voltage Vcc to the control circuit 3 reaches the turn-on voltage Von, the output of the comparator CP changes from high to low to turn off the switch SW1, to stop charging the capacitor C10. Irrespective of this, the tertiary winding P2 of the transformer T generates a voltage, which is rectified and smoothed through the diode D10 and capacitor C10 into a DC voltage. This DC voltage is supplied as Vcc to the control circuit 3 so that the control circuit 3 continuously operates. In this way, the starting current Ist is stopped once the control circuit 3 has started, to thereby improve efficiency.

FIG. 2 is a timing chart showing signals in the switching power source apparatus of FIG. 1 in a case where the DC power source E is cut and resumed. In FIG. 2, the DC power source E is enabled to start the switching power source apparatus, is once cut, and then, is again enabled.

At time of t1, the DC power source E is applied to the switching power source apparatus. Namely, the voltage Vst of the DC power source E to the resistor R1 starts to increase. At t2, the voltage Vst reaches a level to drive the constant current circuit CC1. The constant current circuit CC1 supplies the constant current Ist to charge the capacitor C10 and the voltage Vcc to the control circuit 3 is increased. At t3, the voltage Vcc reaches the turn-on voltage Von, and therefore, the control circuit 3 provides the drive signal Drv to turn on/off the switching element Q10. At the same time, the comparator CP of the start circuit 1 provides a low-level output to turn off the switch SW1.

At t4, the DC power source E is cut and the voltage Vst starts to decrease. At t5, the control circuit 3 becomes unable to control the output voltage Vout, and therefore, the output voltage Vout and the voltage Vcc to the control circuit 3 start to decrease. At t6, the voltage Vcc reaches the turn-off voltage Voff. Then, the comparator CP provides a high-level output to turn on the switch SW1, so that the starting current Ist supplied by the constant current circuit CC1 may charge the capacitor C10. If the DC power source E is continuously cut, the voltage Vst to the start circuit 1 further drops and the constant current circuit CC1 becomes unable to supply the starting current Ist. Then, the voltage Vcc to the control circuit 3 is unable to rise to the turn-on voltage Von and the switching power source apparatus becomes inoperative.

At t6 as shown in FIG. 2, the constant current circuit CC1 starts to supply the starting current Ist. At t7 during the period in which the starting current Ist is being passed, the DC power source E is restarted. The voltage Vst to the start circuit 1 starts to increase and the constant current circuit CC1 continuously supplies the starting current Ist to charge the capacitor C10. At t8, the voltage Vcc to the control circuit 3 reaches the turn-on voltage Von and the control circuit 3 provides the drive signal Drv to turn on/off the switching element Q10.

FIG. 3 is a timing chart showing signals in the switching power source apparatus of FIG. 1 when the switching power source apparatus conducts an auto-restart operation in an overload state. The auto-restart operation takes place when the load 5 encounters an overload state or a short-circuit state that stops the switching power source apparatus, to try to resume a normal operation of the switching power source apparatus once the overload state or short-circuit state resolves.

If an overload state occurs, a current passing through the switching element Q10 increases and a voltage at the current detection resistor R10 increases. This voltage is detected at t1 by the control circuit 3. If the overload state continues for a predetermined delay time after detecting the voltage, the control circuit 3 stops at t2 the drive signal Drv to the switching element Q10. As a result, the output voltage Vout and the voltage Vcc to the control circuit 3 decrease, and at t3, the voltage Vcc reaches the turn-off voltage Voff. This results in turning on the switch SW1 and charging the capacitor C10 with the current Ist from the constant current circuit CC1, to increase the voltage Vcc. At t4, the voltage Vcc reaches the turn-on voltage Von, so that the control circuit 3 resumes the drive signal Drv.

If the overload state continues for the delay time, the control circuit 3 again stops at t5 the drive signal Drv to the switching element Q10. These actions are repeated until the overload state dissolves. When the overload state is cleared, a normal operation resumes. During the overload state, the start circuit 1 supplies the starting current Ist intermittently so that the switching element Q10 intermittently conducts ON/OFF operation under the overload state.

FIG. 4 is a timing chart showing signals in the switching power source apparatus of FIG. 1 with the load 5 being in a short-circuit state. If the load 5 is short-circuited, the switching element Q10 is immediately stopped without a delay time. During a period in which the short-circuit state continues, intermittent ON/OFF operation of the switching element Q10 is carried out in a similar manner to the overload state of FIG. 3.

A starting time from when the DC power source E is applied to the switching power source apparatus to when the switching element Q10 starts ON/OFF operation to generate the output voltage Vout is determined by the starting current Ist from the constant current circuit CC1 and the capacitance of the capacitor C10. To shorten the starting time, the starting current Ist should be larger. The large starting current, however, results in increasing losses in the start circuit 1. In particular, if the auto-restart operation is achieved during an overload state or a short-circuit state by intermittently conducting ON/OFF operation of the switching element Q10, the larger starting current increases losses in the start circuit 1 and switching element Q10 to generate heat to break elements.

To solve this problem, Japanese Unexamined Patent Application Publication No. 2003-333840 discloses a switching power source apparatus having a start circuit including a constant current circuit. This constant current circuit supplies a starting current through a current limit resistor, a first npn-type transistor, and a current detection resistor to a power source terminal of a control circuit. The constant current circuit detects a terminal voltage of the current detection resistor with a second npn-type transistor and controls a current passed through a resistor to a base of the first npn-type transistor. A constant starting current supplied by the start circuit is passed through the current detection resistor. The current detection resistor is connected in parallel with a capacitor, so that a large starting current is supplied at the starting of the apparatus until the capacitor is charged. Once the capacitor is charged, the starting current is determined by the current detection resistor and second npn-type transistor. In this way, the constant current circuit differs a current value between the starting operation and a normal operation, to shorten a starting time and reduce losses in the start circuit.

SUMMARY OF THE INVENTION

When executing the auto-restart operation in an overload state or a short-circuit state, however, the switching power source apparatus mentioned above is unable to sufficiently reduce losses in the start circuit 1 and switching element Q10 during intermittent ON/OFF operation of the switching element Q10. Increasing a current value of the constant current circuit during a period in which the capacitor parallel to the current detection resistor is charged raises a problem of changing the capacitor charging period and a starting time if there is a change in an input voltage.

The present invention provides a switching power source apparatus capable of reducing losses in a start circuit and switching element even during intermittent ON/OFF operation of the switching element.

According to an aspect of the present invention, there is provided a switching power source apparatus including a switching element connected through a primary winding of a transformer to a DC power source; a control circuit configured to control ON/OFF operation of the switching element; a start circuit configured to supply a source voltage to the control circuit so that a starting current passes through the control circuit; a first rectify-smooth circuit configured to rectify and smooth a voltage generated by a secondary winding of the transformer into an output voltage and supply the output voltage to a load; and a second rectify-smooth circuit configured to rectify and smooth a voltage generated by a tertiary winding of the transformer into a source voltage to be supplied to the control circuit. The start circuit is configured to supply a first starting current generated from the DC power source to start the apparatus, and once the apparatus has started, stop the first starting current; if the source voltage to the control circuit decreases to a turn-off voltage after the apparatus has started, supply a second starting current that is smaller than the first starting current; and if the source voltage to the control circuit further decreases to a predetermined voltage that is lower than the turn-off voltage, supply the first starting current.

DESCRIPTION OF THE PREFERRED EMBODIMENT

Figure 1:
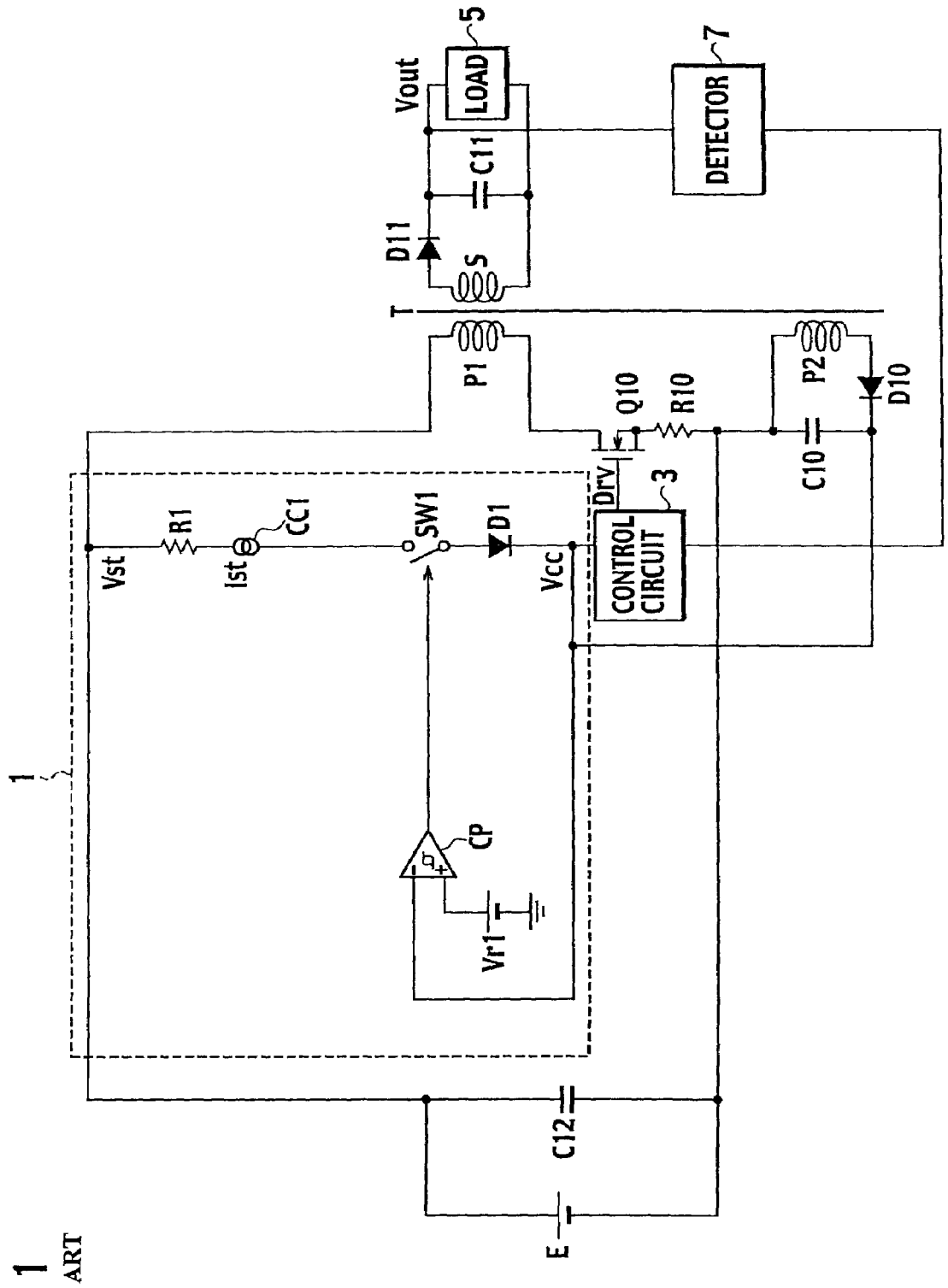
FIG. 1 is a circuit diagram showing a switching power source apparatus according to a related art.
Figure 2:
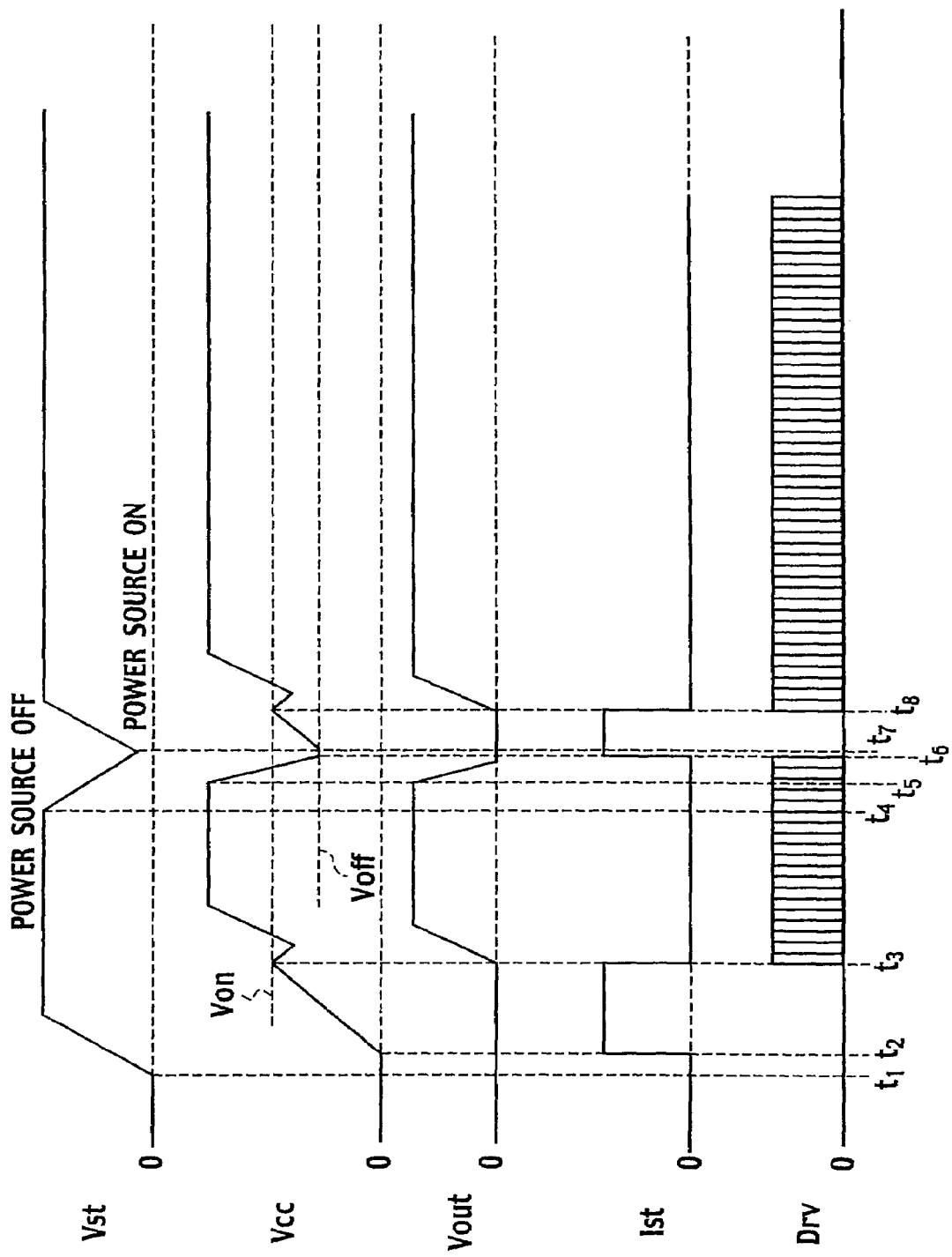
FIG. 2 is a timing chart showing signals in the switching power source apparatus of FIG. 1 when a DC power source is cut and then resumed.
Figure 3:
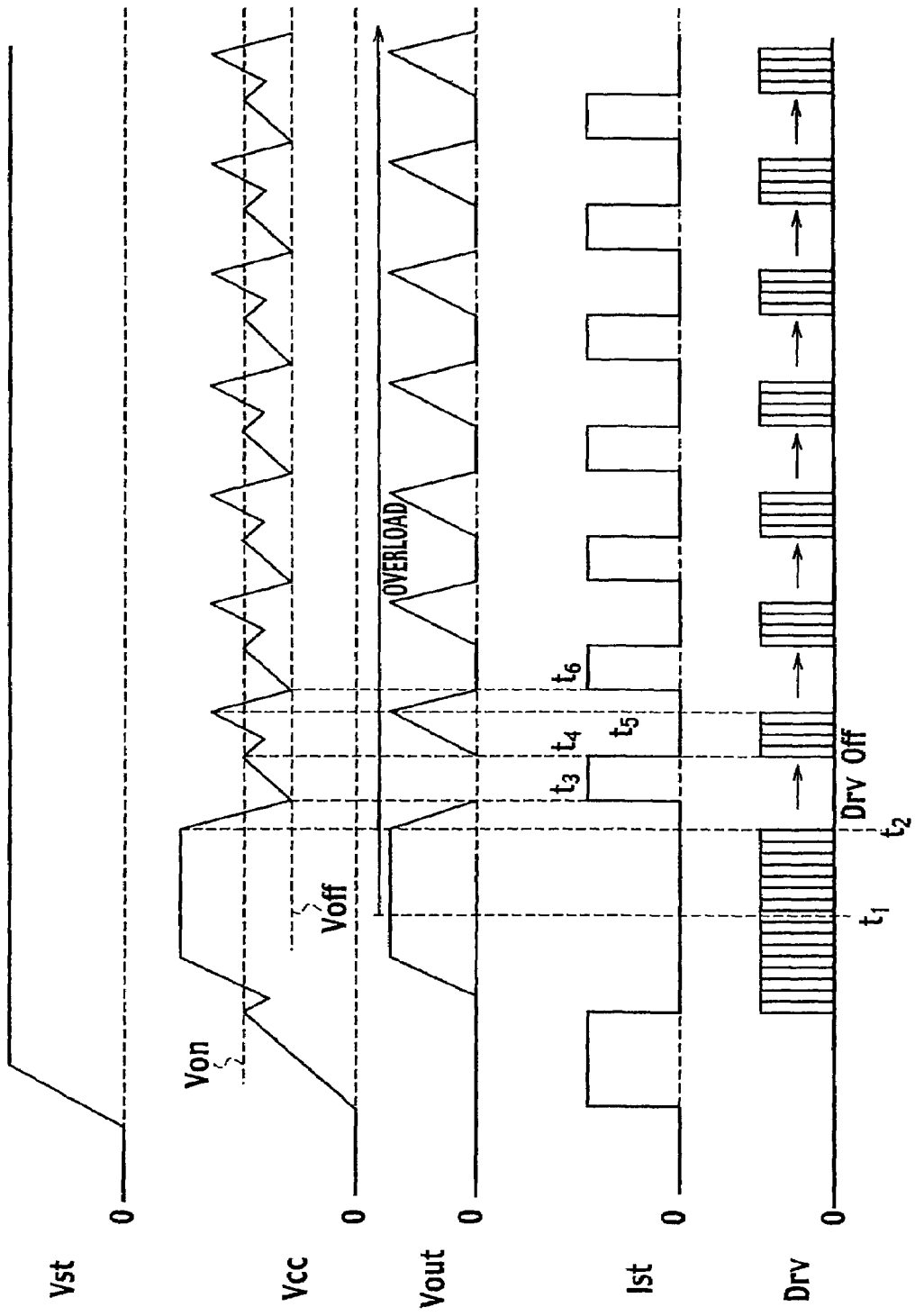
FIG. 3 is a timing chart showing signals in the switching power source apparatus of FIG. 1 in an overload state.
Figure 4:
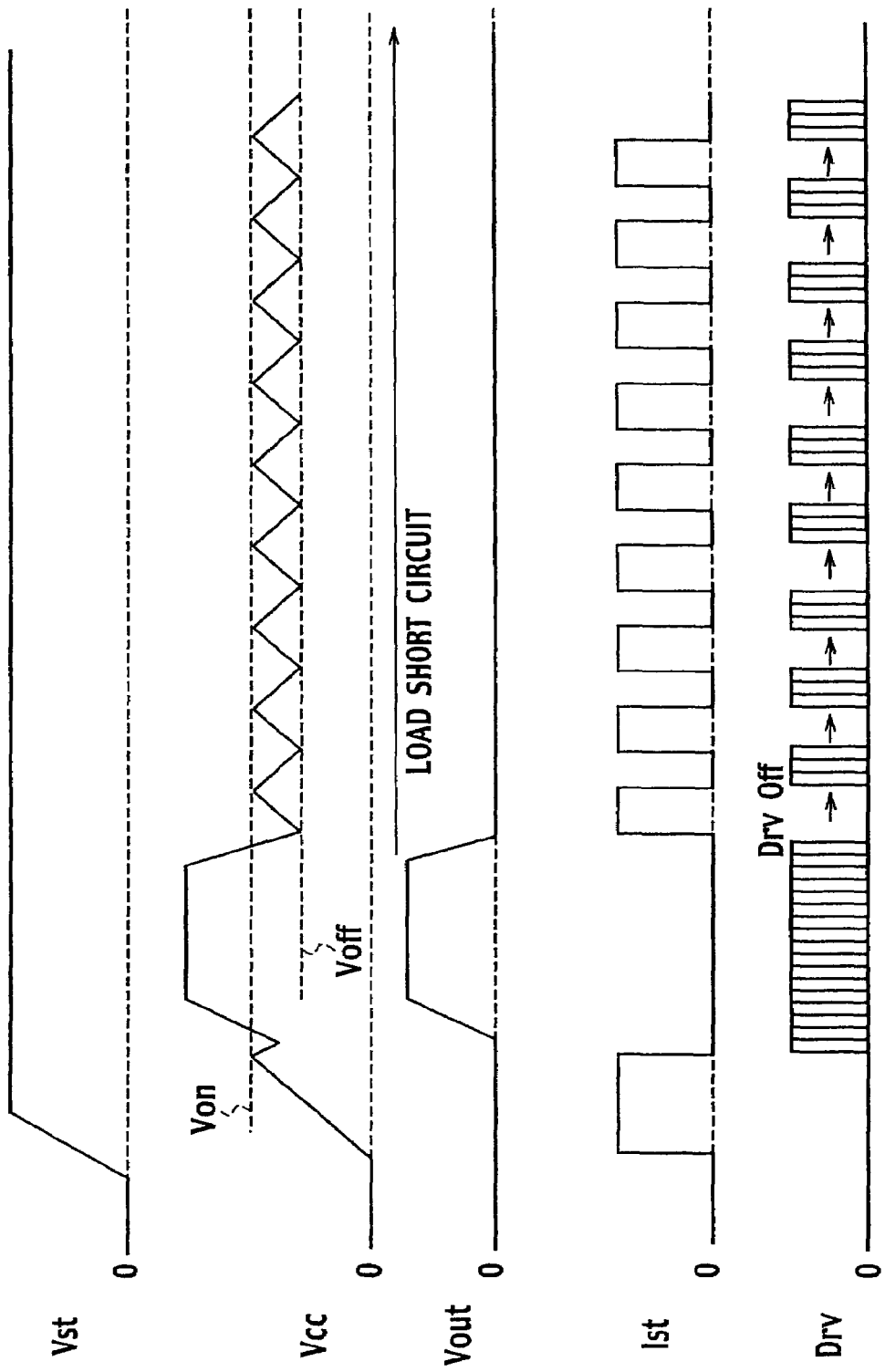
FIG. 4 is a timing chart showing signals in the switching power source apparatus of FIG. 1 in a short-circuit state.

Embodiments of the present invention will be explained in detail with reference to FIGS. 5 to 10. In these drawings, the same or like parts as those of the related art of FIGS. 1 to 4 are represented with like reference numerals.

First Embodiment

Figure 5:
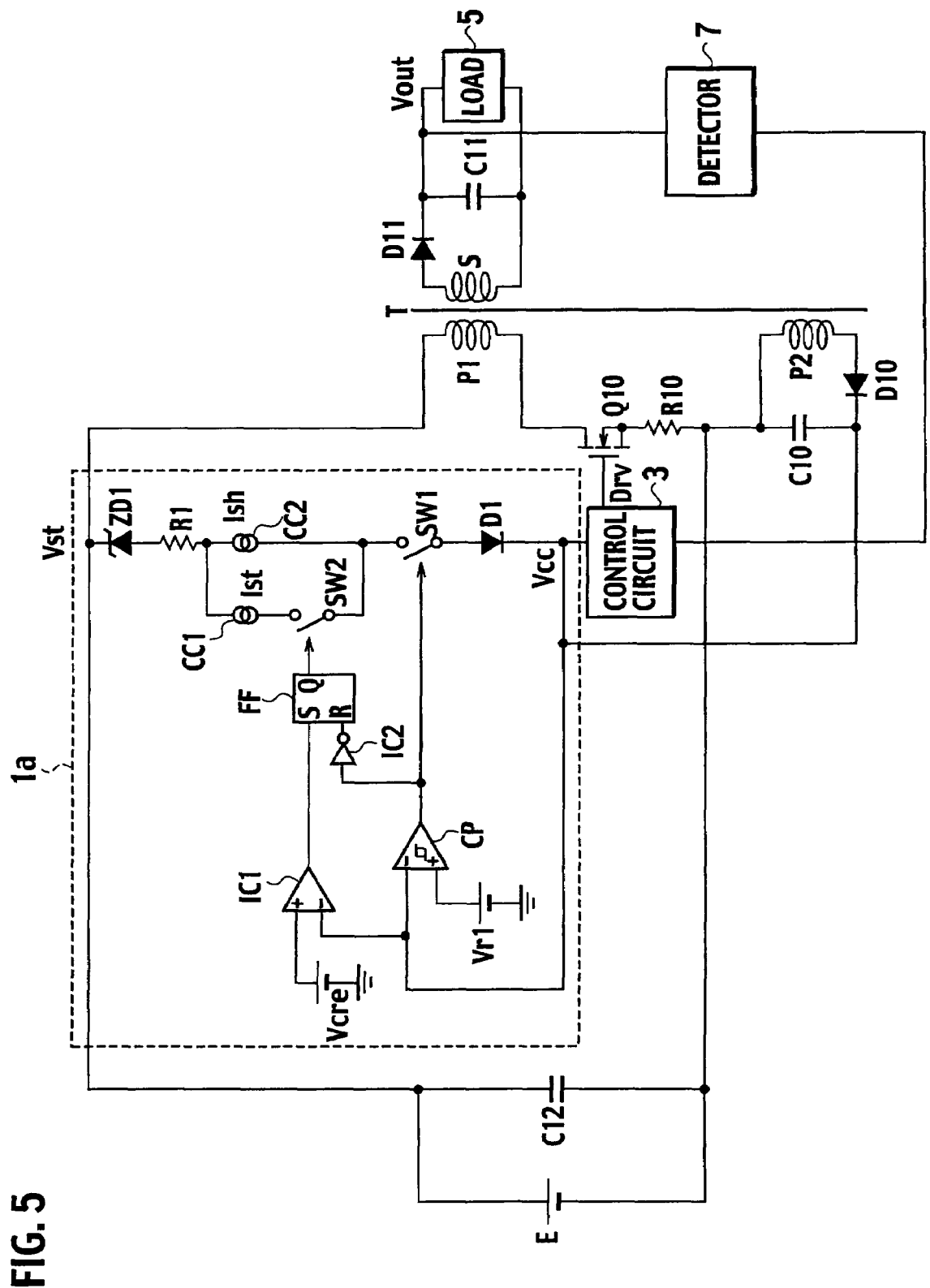
FIG. 5 is a circuit diagram showing a switching power source apparatus according to a first embodiment of the present invention.

FIG. 5 is a circuit diagram showing a switching power source apparatus according to a first embodiment of the present invention. The switching power source apparatus of FIG. 5 differs from the related art of FIG. 1 in the structure of a start circuit 1a. Accordingly, the start circuit 1a will be explained in detail.

The start circuit 1a includes a series circuit connected between a first end of a primary winding P1 of a transformer T and a first end of a control circuit 3, the series circuit including a Zener diode ZD1, resistor R1, constant current circuit CC2, switch SW1, and diode D1. Ends of the constant current circuit CC2 are connected to a series circuit including a constant current circuit CC1 and switch SW2.

A comparator CP has an inverting input terminal connected to a connection point between a cathode of the diode D1 and the first end of the control circuit 3, a non-inverting input terminal connected to a reference power source Vr1, and an output terminal connected to a contact of the switch SW1. The comparator CP has a hysteresis characteristic so that the comparator CP provides a low-level output if the inverting input terminal reaches, for example, 18 V and changes the low-level output to a high-level output if the inverting input terminal becomes lower than, for example, 10 V.

A comparator IC1 has an inverting input terminal connected to the connection point between the cathode of the diode D1 and the first end of the control circuit 3, anon-inverting input terminal connected to a reference power source Vcre (e.g., 9.5 V), and an output terminal connected to a set terminal S of an RS flip-flop FF. An inverter IC2 inverts an output from the comparator CP and supplies the inverted output to a reset terminal R of the RS flip-flop FF. The RS flip-flop FF has an output terminal Q connected to the switch SW2.

When starting the apparatus, a first starting current is supplied by a DC power source E according to the start circuit 1a with the above-mentioned configuration. The first starting current is the sum of a constant current Ist supplied by the constant current circuit CC1 and a constant current Ish supplied by the constant current circuit CC2. Once the apparatus has started, the start circuit 1a stops the first starting current. Thereafter, if a power source voltage Vcc to the control circuit 3 decreases to a turn-off voltage Voff, the start circuit 1a supplies a second starting current (i.e. the constant current Ish from the constant current circuit CC2) that is smaller than the first starting current (Ist+Ish). If the voltage Vcc to the control circuit 3 further decreases to a predetermined voltage that is lower than the turn-off voltage, the start circuit 1a supplies the first starting current.

Operation of the switching power source apparatus according to the first embodiment will be explained. When the DC power source E is enabled for the switching power source apparatus, the switches SW1 and SW2 of the start circuit 1a are each in ON state. Accordingly, a voltage Vst of the DC power source E is applied through the Zener diode ZD1 and resistor R1 to the constant current circuits CC1 and CC2. The constant current circuit CC1 provides the constant current Ist of 2.5 mA and the constant current circuit CC2 provides the constant current Ish of 0.5 mA, for example, to charge a capacitor C10 through the diode D1.

At the starting of the apparatus, the voltage Vcc to the control circuit 3 is lower than the reference voltage Vcre (e.g., 9.5 V) or a turn-on voltage Von (e.g., 18 V), and therefore, the comparator CP provides a high-level output to maintain the ON state of the switch SW1. At this time, the inverter IC2 provides a low-level output and the comparator IC1 provides a high-level output, and therefore, the output Q of the RS flip-flop FF provides a high-level output to maintain the ON state of the switch SW2.

When the voltage Vcc to the control circuit 3 increases to 9.5 V, the output of the comparator IC1 changes to low. However, the output Q of the RS flip-flop FF is unchanged so that the switch SW2 maintains the ON state. When the voltage Vcc increases to the turn-on voltage Von, the control circuit 3 provides a drive signal Drv to make a switching element Q10 start ON/OFF operation to apply a DC output voltage Vout to a load 5. At this time, the output of the comparator CP changes to low to turn off the switch SW1, and the output of the inverter IC2 changes to high level to reset the RS flip-flop FF. As a result, the output Q of the RS flip-flop FF changes to low level to turn off the switch SW2.

Figure 6:
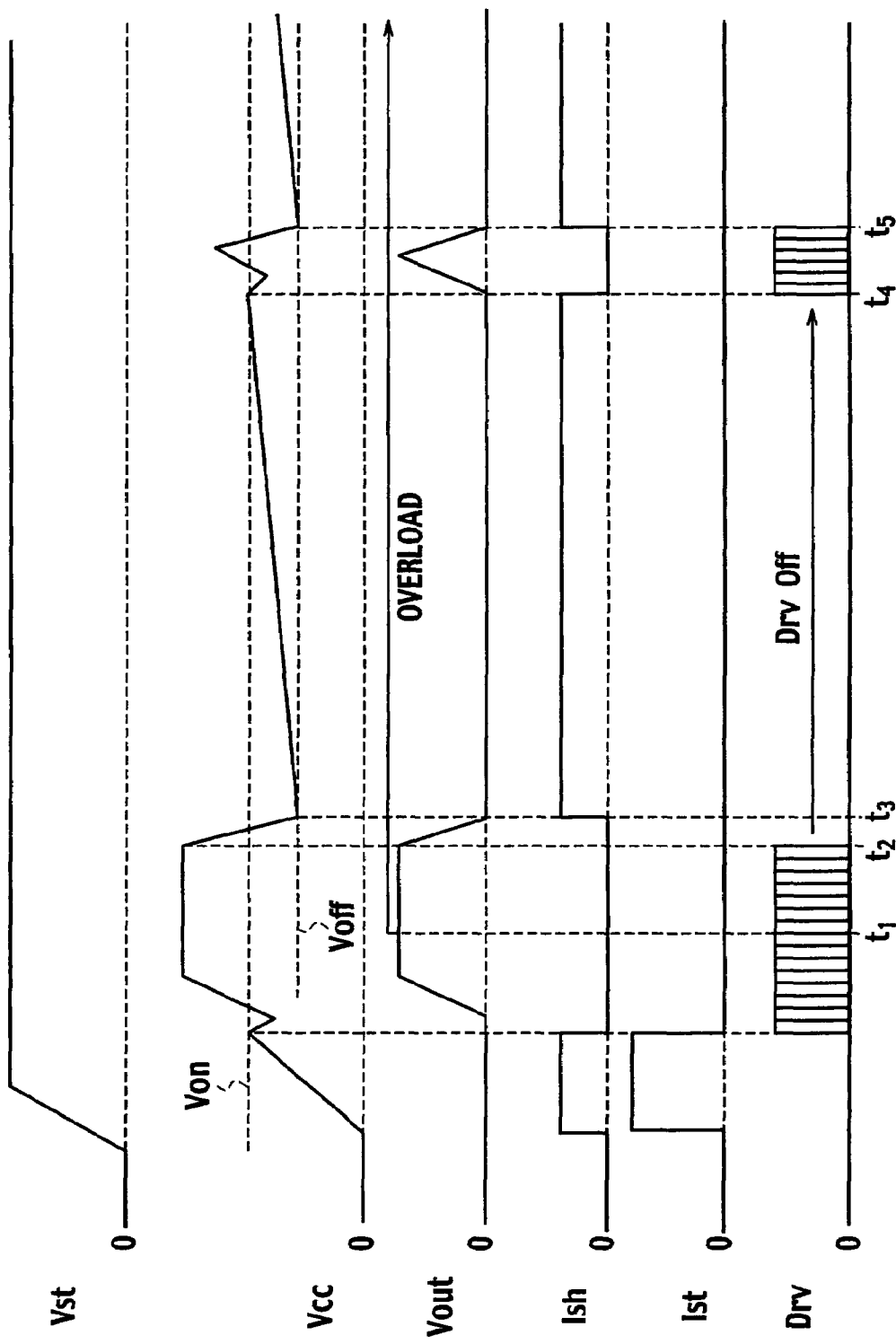
FIG. 6 is a timing chart showing signals in the switching power source apparatus of FIG. 5 in an overload state.

Operation of the switching power source apparatus of FIG. 5 in an overload state will be explained with reference to FIG. 6.

When an overload state occurs, a current passing through the switching element Q10 increases to increase a voltage appearing at the current detection resistor R10. This voltage is detected at t1 by the control circuit 3. If the overload state is still present after a predetermined delay time from the voltage detection, the control circuit 3 stops at t2 the drive signal Drv to the switching element Q10. As a result, the output voltage Vout and the voltage Vcc to the control circuit 3 decrease. At t3, the voltage Vcc reaches a turn-off voltage Voff (e.g., 10 V) and the comparator CP provides a high-level output to turn on the switch SW1.

Although the output of the inverter IC2 changes to low, the output Q of the RS flip-flop FF is unchanged to keep the OFF state of the switch SW2. As a result, only the current Ish (e.g., 0.5 mA) from the constant current circuit CC2 charges the capacitor C10 to gradually increase the voltage Vcc to the control circuit 3. At t4, the voltage Vcc reaches the turn-on voltage Von to make the control circuit 3 again output the drive signal Drv. At this time, the switch SW1 is turned off to stop the current Ish of the constant current circuit CC2.

If the overload state continues after the predetermined delay time from t4, the control circuit 3 again stops the drive signal Drv to the switching element Q10 at t5. Then, the switch SW1 is turned on to pass the current Ish supplied by the constant current circuit CC2 to charge the capacitor C10 and increase the voltage Vcc to the control circuit 3. The output of the comparator IC1 is low, and therefore, the output Q of the RS flip-flop FF is unchanged to maintain the OFF state of the switch SW2. These actions are repeated until the overload state disappears. Once the overload state disappears, a normal operation resumes.

According to the first embodiment, an overload state causes the start circuit 1a to intermittently pass a starting current so that the switching element Q10 intermittently conducts ON/OFF operation under the overload state. The starting current to be passed in the overload state is only the current Ish that is small to reduce losses in the start circuit 1a. A starting period in which the voltage Vcc to the control circuit 3 changes from the turn-off voltage Voff to the turn-on voltage Von is long to extend an intermittent period during which the drive signal Drv is stopped. This results in reducing average losses in the start circuit 1a and switching element Q10.

Figure 7:
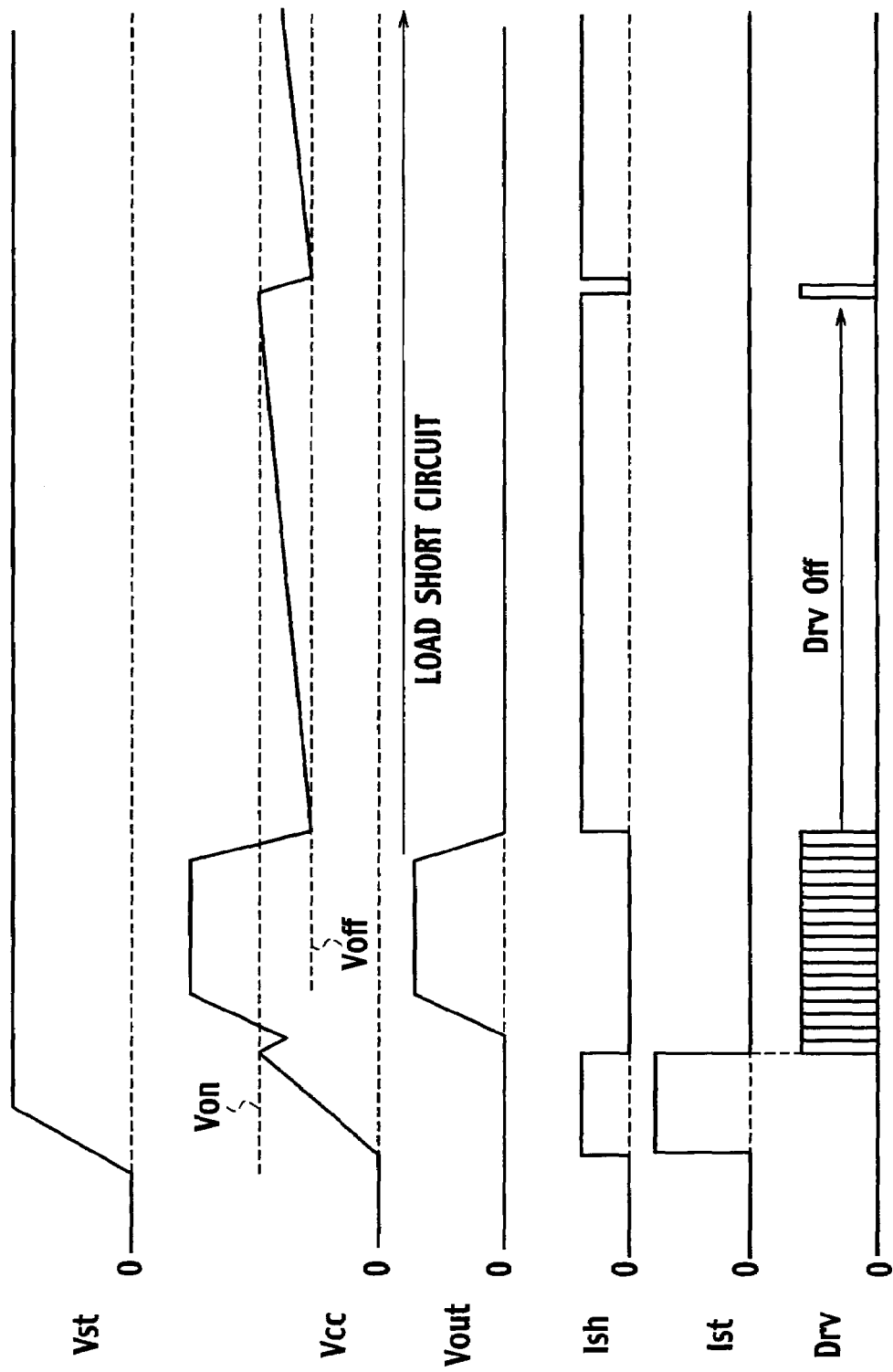
FIG. 7 is a timing chart showing signals in the switching power source apparatus of FIG. 5 in a short-circuit state.

FIG. 7 is a timing chart showing signals in the switching power source apparatus of the first embodiment when the load 5 causes a short circuit in events. Like the related art of FIG. 4, the short-circuit state causes the switching element Q10 to be immediately made inoperative without a delay time. During the short-circuit state, the switching element Q10 intermittently conducts ON/OFF operation. Similar to the overload state of FIG. 6, a starting current to be passed in the short-circuit state is only the current Ish that is low to reduce losses. A starting period in which the voltage Vcc changes from the turn-off voltage Voff to the turn-on voltage Von is long to extend an intermittent period during which the drive signal Drv is stopped. This results in reducing average losses in the start circuit 1a and switching element Q10.

Figure 8:
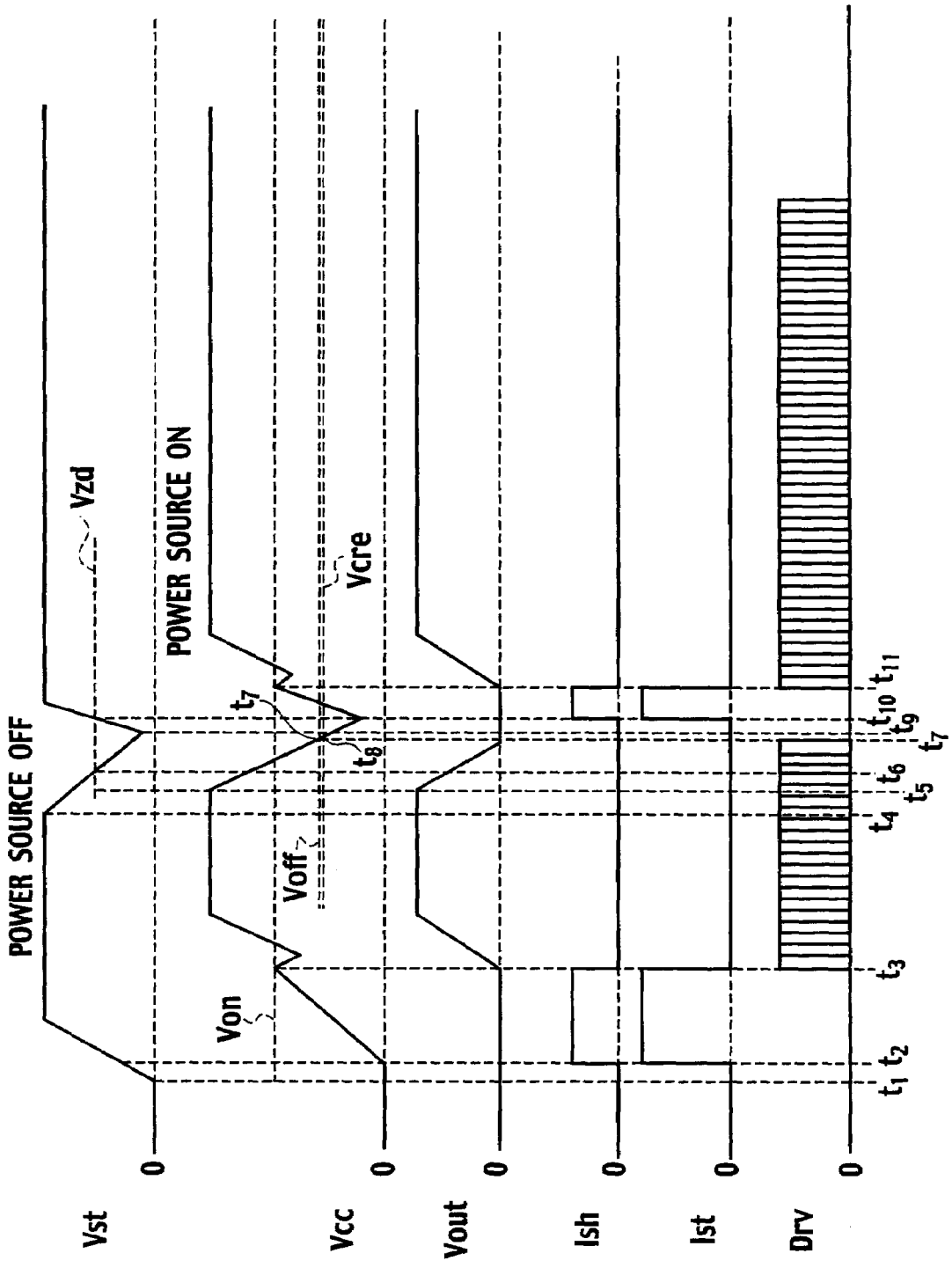
FIG. 8 is a timing chart showing signals in the switching power source apparatus of FIG. 5 when a DC power source is cut and then resumed.
Figure 9:
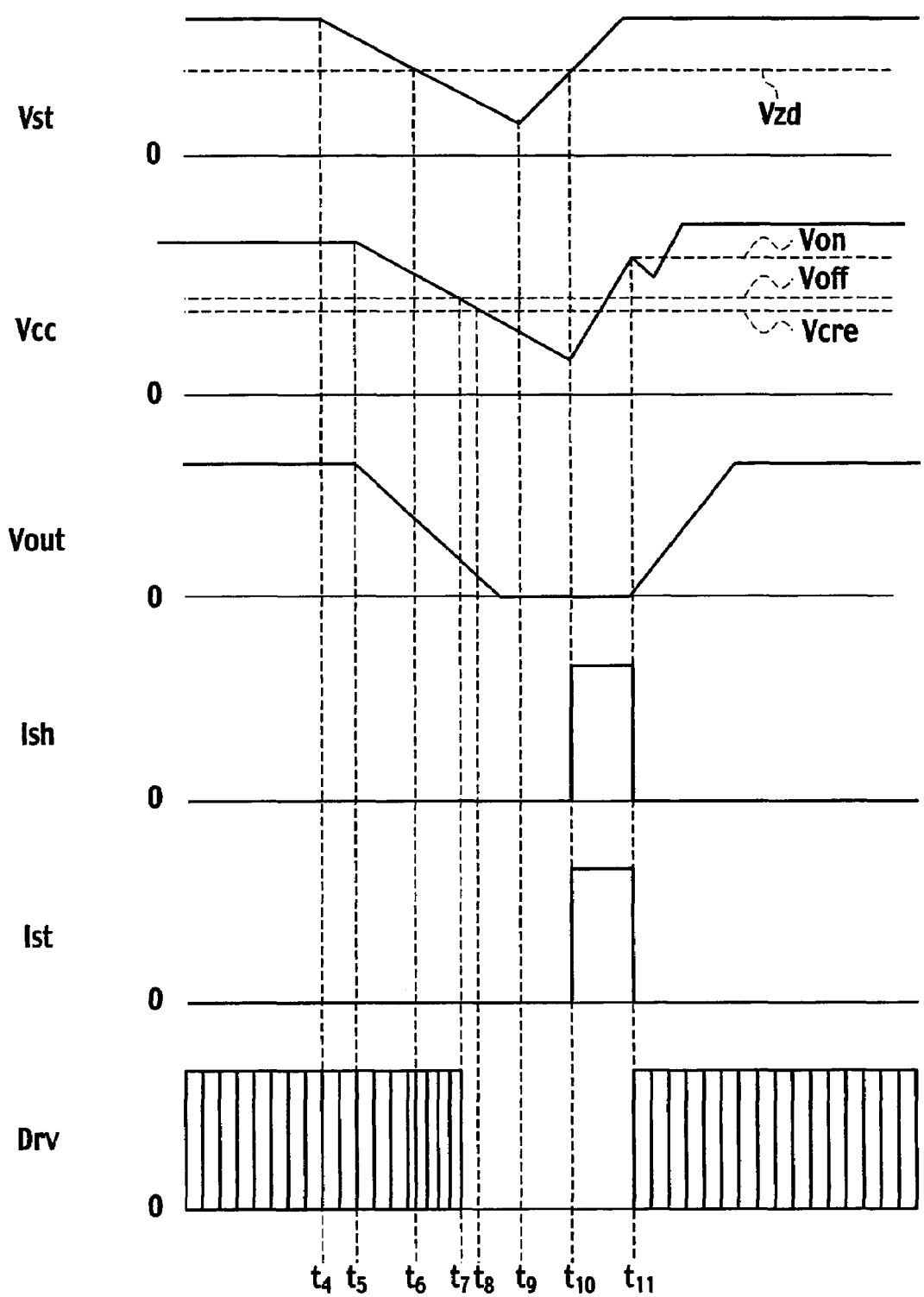
FIG. 9 is a timing chart showing the details of the signals shown in FIG. 8 between a power source OFF point and a power source ON point.

FIG. 8 is a timing chart showing signals in the switching power source apparatus of the first embodiment when the DC power source E is turned off and then turned on. FIG. 9 is a timing chart showing the details of the signals of FIG. 8 in a period from when the DC power source E is turned off to when the same is turned on. With reference to FIGS. 8 and 9, operation of the switching power source apparatus when the DC power source E is turned off and then turned on will be explained.

At t4, the DC power source E is cut and the voltage Vst of the DC power source E starts to decrease. At t5, the output voltage Vout becomes uncontrollable, and therefore, starts to decrease. A voltage generated by a tertiary winding P2 of the transformer T decreases in proportion to the output voltage Vout. Due to this, the voltage Vcc applied to the control circuit 3 also starts to decrease. At t6, the voltage Vst of the DC power source E becomes lower than a Zener voltage Vzd (e.g., 70 V) of the Zener diode ZD1, to turn off the Zener diode ZD1. As a result, the voltage Vst is cut from the constant current circuits CC1 and CC2. At this time, the switches SW1 and SW2 are each OFF, and therefore, no operational change occurs.

The voltages Vst, Vout, and Vcc continuously decrease, and at t7, the voltage Vcc to the control circuit 3 reaches the turn-off voltage Voff (e.g., 10 V) so that the control circuit 3 stops the drive signal Drv to the switching element Q10 and establishes a standby state. At this time, the output of the comparator CP changes to high to turn on the switch SW1. This, however, does not result in passing a current because the Zener diode ZD1 is inoperative/disabled and no voltage is applied to the constant current circuits CC1 and CC2. The voltage Vcc continuously drops, and at t8, reaches the reference voltage Vcre (e.g., 9.5 V). Then, the output of the comparator IC changes to high to set the RS flip-flop FF, which then provides a high-level output from the output Q to turn on the switch SW2. This, however, does not result in passing a current because the Zener diode ZD1 is disabled and no voltage is applied to the constant current circuit CC1.

At t9, the DC power source E resumes to increase the source voltage Vst. At t10, the voltage Vst exceeds the Zener voltage Vzd of the Zener diode ZD1 to enable the Zener diode ZD1 and apply the voltage Vst to the constant current circuits CC1 and CC2. At this time, the switches SW1 and SW2 are each ON, and therefore, the starting currents Ist and Ish (i.e., the first starting current of Ist plus Ish) pass therethrough. At till, the voltage Vcc applied to the control circuit 3 reaches the turn-on voltage Von and the control circuit 3 outputs the drive signal Drv to make the switching element Q10 carry out ON/OFF operation. Since the first starting current is the sum of the currents supplied from both the constant current circuits CC1 and CC2, a starting time will be short.

At t7 when the voltage Vcc reaches the turn-off voltage Voff to put the control circuit 3 in a standby state, power consumption becomes very small, and therefore, it takes a long time until the voltage Vcc further drops to the reference voltage Vcre. At this time, if there is no Zener diode ZD1 to cut the power source voltage Vst, the constant current circuit CC2 charges the capacitor C10 to prevent the voltage Vcc from decreasing to the reference voltage Vcre at which the switch SW2 is turned on. On the contrary, depending on the level of the source voltage Vst, a normal current is supplied by the constant current circuit CC2 to increase the voltage Vcc. Then, the voltage Vcc will never decrease to the reference voltage Vcre to turn on the switch SW2.

If the DC power source E is again enabled at this time, the power source voltage Vst increases to charge the capacitor C10 only with the current Ish supplied by the constant current circuit CC2. Namely, the current Ish is the only starting current, and therefore, a long starting time is needed to increase the voltage Vcc up to the turn-on voltage Von. If the Zener diode ZD1 is provided, the Zener diode ZD1 with a Zener voltage of, e.g., 70 V cuts the power source voltage Vst from the constant current circuits CC1 and CC2 before the voltage Vcc drops to the turn-off voltage Voff (e.g., 10V). This results in remarkably shortening a time between t7 and t8 to surely turn on the switch SW2. As a result, when the DC power source E is restarted, the current Ish by the constant current circuit CC2 plus the current Ist by the constant current circuit CC1 realize a short starting time.

The Zener voltage (breakdown voltage) Vzd of the Zener diode ZD1 is greater than a voltage of the DC power source E that is applied to the Zener diode ZD1 when the voltage Vcc to the control circuit 3 drops to the turn-off voltage Voff after the DC power source E is cut. According this setting, the first starting current (Ish+Ist) is surely provided when the DC power source E is resumed, to realize a short starting time due to the second starting current (Ish) alone instead of a long starting time.

Second Embodiment

Figure 10:
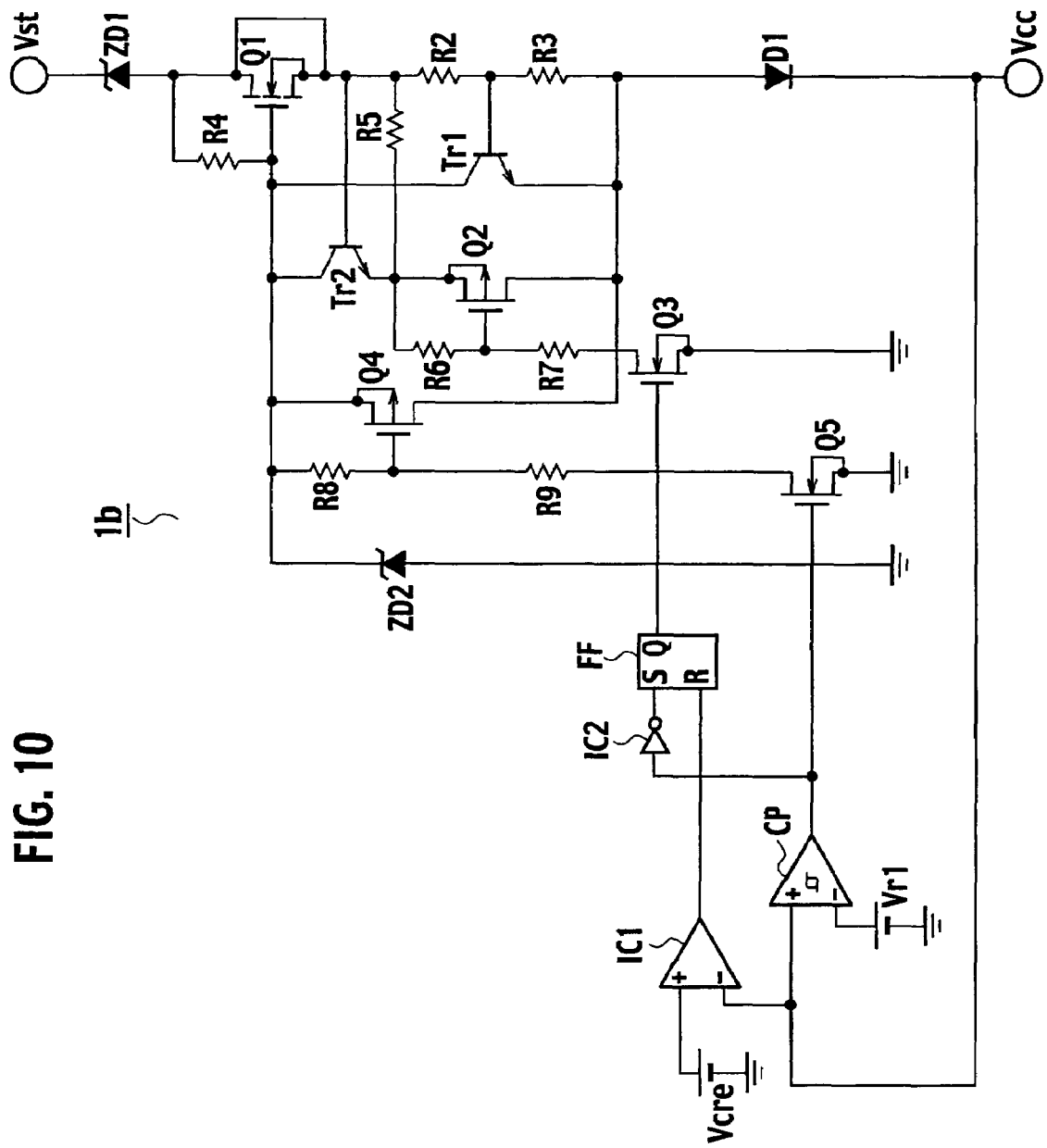
FIG. 10 is a circuit diagram showing a start circuit of a switching power source apparatus according to a second embodiment of the present invention.

FIG. 10 is a circuit diagram showing a start circuit of a switching power source apparatus according to a second embodiment of the present invention. The start circuit 1b of the second embodiment employs other constant current circuits in place of the constant current circuits CC1 and CC2 of the first embodiment of FIG. 5. The other parts of the second embodiment are the same as those of the first embodiment, and therefore, are represented with the same reference numerals.

In the start circuit 1b of FIG. 10, the comparator CP has the non-inverting input terminal (depicted by "+") connected to the connection point between the cathode of the diode D1 and the first end of the control circuit 3, the inverting input terminal (depicted by "−") connected to the reference power source Vr1, and the output terminal connected to the inverter IC2 and a gate of an FET Q5.

The comparator IC1 has the inverting input terminal (−) connected to the connection point between the cathode of the diode D1 and the first end of the control circuit 3, the non-inverting input terminal (+) connected to the reference power source Vcre, and the output terminal connected to the reset terminal R of the RS flip-flop FF. The inverter IC2 inverts an output signal from the comparator CP and supplies the inverted signal to the set terminal (depicted by "S") of the RS flip-flop FF. The output terminal (depicted by "Q") of the RS flip-flop FF provides an output signal to a gate of an FET Q3.

Between the first end of the primary winding P1 of the transformer T and the first end of the control circuit 3, there is connected a series circuit that includes the Zener diode ZD1, an FET Q1, a resistor R2, a resistor R3, and the diode D1. A gate of the FET Q1 is grounded through a Zener diode ZD2. Between the gate and drain of the FET Q1, a resistor R4 is connected. A transistor Tr1 has a base connected to a connection point between the resistors R2 and R3, an emitter connected to a connection point between the anode of the diode D1 and the resistor R3, and a collector connected to the gate of the FET Q1.

A transistor Tr2 has a base connected to a connection point between the source of the FET Q1 and the resistor R2, an emitter connected to a drain of an FET Q2, and a collector connected to the gate of the FET Q1. The FET Q2 has a gate connected to a connection point between resistors R6 and R7 and a source connected to the connection point between the anode of the diode D1 and the resistor R3. The resistor R6 is connected in series with a resistor R5 connected to the source of the FET Q1.

The FET Q3 has the gate connected to the output terminal Q of the RS flip-flop FF, a source grounded, and a drain connected to the resistor R7. An FET Q4 has a gate connected to a connection point between resistors R8 and R9, a drain connected to the gate of the FET Q1, and a source connected to the connection point between the anode of the diode D1 and the resistor R3. The FET Q5 has the gate connected to the output terminal of the comparator CP, a source grounded, and a drain connected to the resistor R9.

The FETs Q4 and Q5 and the resistors R8 and R9 form the switch SW1 that is used to turn on/off the FET Q1 to start and stop the constant current circuits.

The FETs Q2 and Q3 and the resistors R5, R6, and R7 form the switch SW2. When the switch SW2 is in an OFF state, the first constant current circuit consisting of the FET Q1, transistor Tr1, and resistors R2, R3, and R4 supplies a first starting current Ist (e.g., 2.5 mA).

When the switch SW2 is in an ON state, the second constant current source consisting of the FET Q1, transistor Tr2, and resistors R2, R3, and R4 supplies a second starting current Ish (e.g., 0.5 mA). The second starting current passes through the resistor R2, and therefore, becomes smaller than the first starting current. The switch SW2 is turned on and off, to switch the first and second starting currents of the first and second constant current sources from one to another.

The start circuit 1b employing the constant current switching function can be integrated into an integrated circuit (IC) because it uses FETs and transistors.

The start circuit 1b according to the second embodiment becomes operative to provide the first starting current at the starting of the apparatus, stops the first starting current once the apparatus has started, provides the second starting current being smaller than the first starting current if a voltage Vcc to the control circuit 3 drops to a turn-off voltage Voff, and provides the first starting current again if the voltage Vcc further drops to a predetermined voltage that is lower than the turn-off voltage Voff. Consequently, the switching power source apparatus according to the second embodiment provides the same effect as the first embodiment.

The starting technique of the present invention is applicable not only to the switching power source configuration of FIG. 5 but also to other switching power source configurations.

When the load 5 (FIG. 5) is in a standby state, a current passing through the load 5 becomes very small to drop a voltage generated by the tertiary winding P2 of the transformer T. Due to this, the voltage Vcc to the control circuit 3 sometimes drops below the turn-off voltage Voff.

In this case, the control circuit 3 according to the present invention stops the drive signal Drv to stop ON/OFF operation of the switching element Q10. Then, the second starting current that is smaller than the first starting current charges the capacitor C10. When the voltage Vcc to the control circuit 3 rises to the turn-on voltage Von, the control circuit 3 resumes the drive signal Drv and the second starting current is stopped. At this time, the voltage generated by the tertiary winding P2 of the transformer T is lower than the turn-off voltage Voff.

As a result, the voltage Vcc to the control circuit 3 decreases. When the voltage Vcc falls lower than the turn-off voltage Voff, ON/OFF operation of the switching element Q10 is stopped. These actions are repeated to intermittently conduct ON/OFF operation of the switching element Q10. In this way, the standby state of the load 5 that decreases the voltage generated by the tertiary winding P2 of the transformer T to an insufficient level triggers the second starting current to intermittently carry out ON/OFF operation of the switching element Q10. The second starting current is small to reduce losses in the start circuit 1a (or 1b) and helps extend intervals of ON/OFF operation of the switching element Q10. This results in reducing losses in the start circuit 1a (or 1b) and switching element Q10 and lowering power consumption during the standby state.

In summary, a switching power source apparatus according to the embodiments of the present invention provides a first starting current when the apparatus starts to operate. To achieve an auto-restart operation under an overload state or a short-circuit state of a load, the apparatus intermittently conducts ON/OFF operation of a switching element with a second starting current that is smaller than the first starting current. This technique reduces losses in a start circuit of the apparatus. The small second starting current helps extend a starting time of the auto-restart operation, thereby elongating intervals of ON/OFF operation of the switching element and reducing average losses in the start circuit, switching element, and the like.

The start circuit is connected in series with a Zener diode, so that the apparatus is quickly restartable with the large first starting current.

The Zener diode has a breakdown voltage that is greater than a voltage of a DC power source that is applied to the Zener diode when a voltage (Vcc) applied to a control circuit of the apparatus drops to a turn-off voltage (Voff) after the DC power source is cut. Due to this setting, the large first starting current is surely provided as the DC power source is restarted and thereby to realize a short starting time instead of a long starting time.

This application claims benefit of priority under 35USC §119 to Japanese Patent Application No. 2006-230868, filed on Aug. 28, 2006, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A switching power source apparatus comprising:
a switching element connected through a primary winding of a transformer to a DC power source;
a control circuit configured to control ON/OFF operation of the switching element;
a start circuit configured to supply a source voltage to the control circuit so that a starting current passes through the control circuit;
a first rectify-smooth circuit configured to rectify and smooth a voltage generated by a secondary winding of the transformer into an output voltage and supply the output voltage to a load; and
a second rectify-smooth circuit configured to rectify and smooth a voltage generated by a tertiary winding of the transformer into a source voltage to be supplied to the control circuit, wherein the start circuit is configured to:
supply a first starting current generated from the DC power source to start the apparatus, and once the apparatus has started, stop the first starting current;
if the source voltage to the control circuit decreases to a turn-off voltage after the apparatus has started, supply a second starting current that is smaller than the first starting current; and
if the source voltage to the control circuit further decreases to a predetermined voltage that is lower than the turn-off voltage, supply the first starting current.

2. The switching power source apparatus of claim 1, further comprising
a Zener diode connected in series with the start circuit.

3. The switching power source apparatus of claim 2, wherein
the Zener diode has a breakdown voltage that is higher than a voltage to be applied from the DC power source to the Zener diode at the time when the source voltage to the control circuit reaches the turn-off voltage after the DC power source is cut.

* * * * *